United States Patent [19]
Sugiyama et al.

[11] 3,905,652
[45] Sept. 16, 1975

[54] AUTOMOTIVE BRAKE CONTROL SYSTEM

[75] Inventors: Hiroshi Sugiyama, Hiratsuka;
Kazuyuki Oride; Masaaki Morita,
both of Yokosuka, all of Japan

[73] Assignee: Nissan Motor Co., Ltd., Yokohama, Japan

[22] Filed: Oct. 23, 1970

[21] Appl. No.: 82,933

[30] Foreign Application Priority Data
Oct. 25, 1969 Japan................. 44-84985
Oct. 25, 1969 Japan................. 44-84986
Oct. 25, 1969 Japan................. 44-84987

[52] U.S. Cl. .......... 303/21 EB; 188/181 A; 303/20;
303/21 A; 303/21 AF; 303/21 F
[51] Int. Cl. ............................................. B60t 8/12
[58] Field of Search ............... 188/181; 303/20, 21;
324/162; 340/262

[56] References Cited
UNITED STATES PATENTS

| | | | |
|---|---|---|---|
| 3,338,637 | 8/1967 | Harned et al. | 303/21 AF |
| 3,433,536 | 3/1969 | Skinner | 303/21 A |
| 3,480,335 | 11/1969 | Inada | 303/21 F |
| 3,486,800 | 12/1969 | Ayers, Jr. | 303/21 F |
| 3,511,542 | 5/1970 | Fielek, Jr. | 303/21 EB |
| 3,523,713 | 8/1970 | Okamoto et al. | 303/21 F |
| 3,552,802 | 1/1971 | Packer et al. | 303/21 F |
| 3,578,819 | 5/1971 | Atkins et al. | 303/21 P |
| 3,583,773 | 6/1971 | Steinbrenner et al. | 303/21 EB |
| 3,588,187 | 6/1971 | Mueller | 303/21 F UX |

*Primary Examiner*—Milton Buchler
*Assistant Examiner*—Stephen G. Kunin
*Attorney, Agent, or Firm*—Depaoli & O'Brien

[57] ABSTRACT

A brake control system for a motor vehicle, having a fluid pressure control apparatus which serves to interrupt the supply of brake operating fluid to the rear wheel cylinder when skidding of the driving wheel or wheels is detected, the control apparatus being operated by means of an electric control apparatus which is responsive to an angular wheel deceleration higher than a predetermined level and to a vacuum in the intake manifold of the engine, the control system being advantageous because the rear wheel cylinder is supplied with a fluid pressure which is closely, or steplessly, related to the variation of the angular wheel deceleration.

10 Claims, 10 Drawing Figures

Fig. 4
A
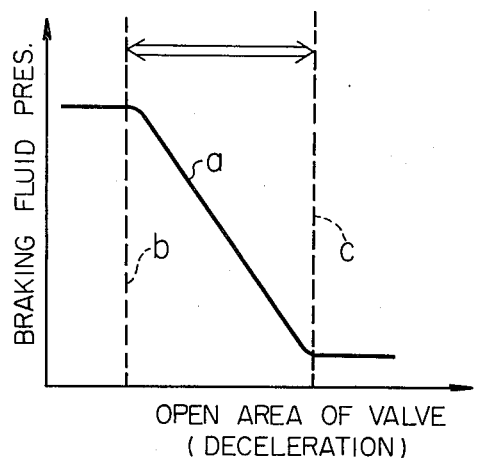
B - 1
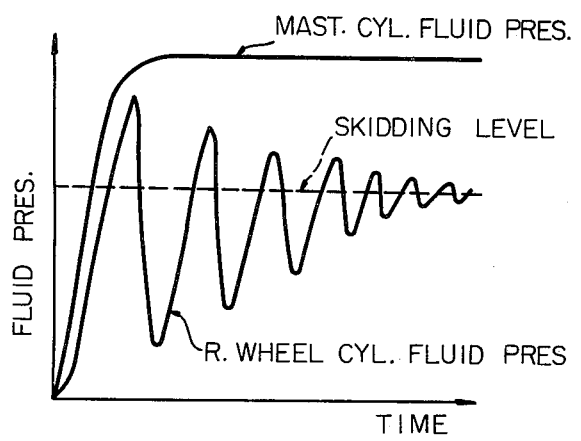

AUTOMOTIVE BRAKE CONTROL SYSTEM

This invention relates generally to vehicle braking systems and, more particularly, to a brake control system for preventing vehicle wheel skidding.

A variety of skid preventive systems have heretofore been proposed, including a system having a vacuum operated control means which is provided in the hydraulic circuit interconnecting the master cylinder and the wheel cylinder of the vehicle driving wheel. Such control means operates in a manner to reduce the brake operating fluid pressure when the angular deceleration of the wheel as detected reaches a predetermined level whereby the skidding condition is removed. This invention contemplates provision of a brake control system including a control means of this particular type, wherein the brake operating fluid pressure is modulated to optimum levels softly and rapidly as soon as skidding of the wheel is detected. A problem is encountered in this type of skid preventive system in that the angular wheel deceleration is detected stepwise. Such stepwise detection of the angular wheel deceleration often causes the brake operating fluid pressure to be reduced excessively so as to critically add to the stopping distance of the vehicle.

An object of this invention is therefore to provide a skid preventive system including a vacuum operated fluid pressure control means which is controlled with signals representing the revolution speed of the driving wheel in a stepless fashion.

Another object is to provide a skid preventive system whereby the brake operating fluid is modulated to levels optimum for soft yet rapid application of the brake as soon as skidding is encountered by the driving wheel or wheels.

Figure 2:
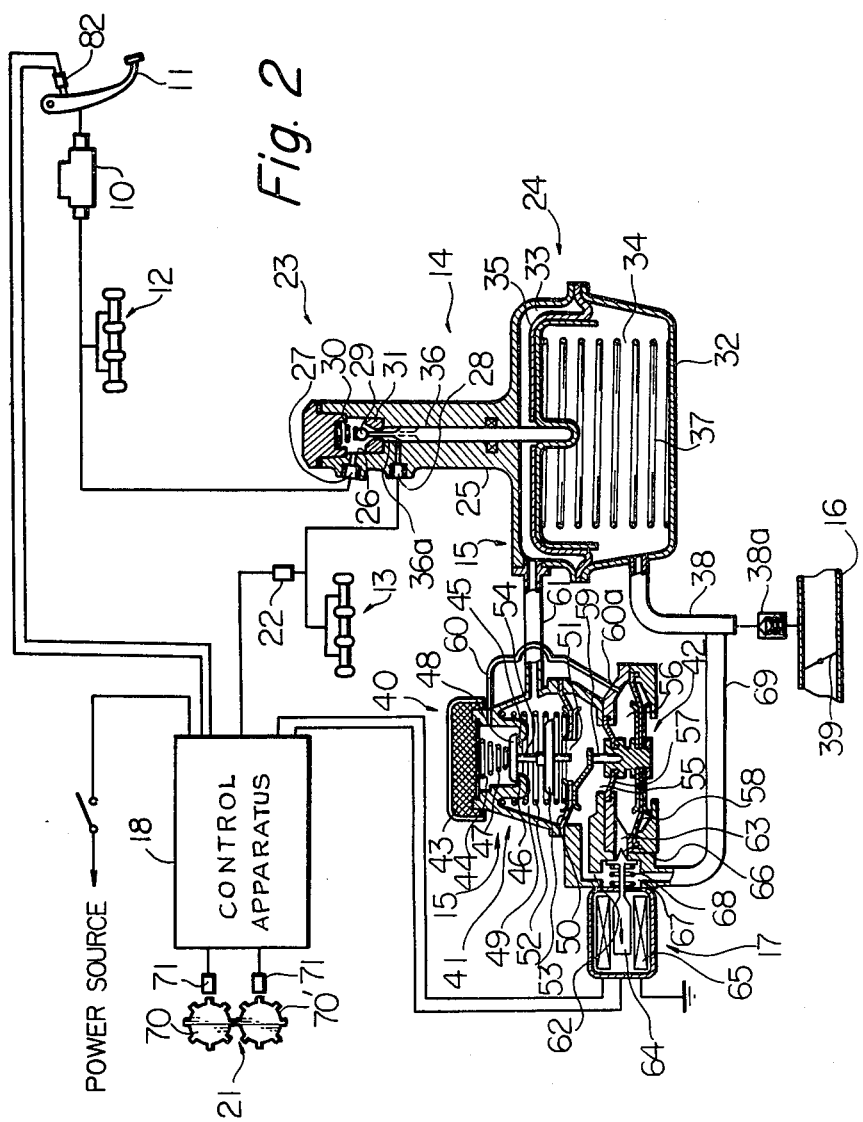
FIG. 2 is a schematic view showing a preferred example of a fluid pressure control means incorporated in the control system shown in FIG. 1.
Figure 3:
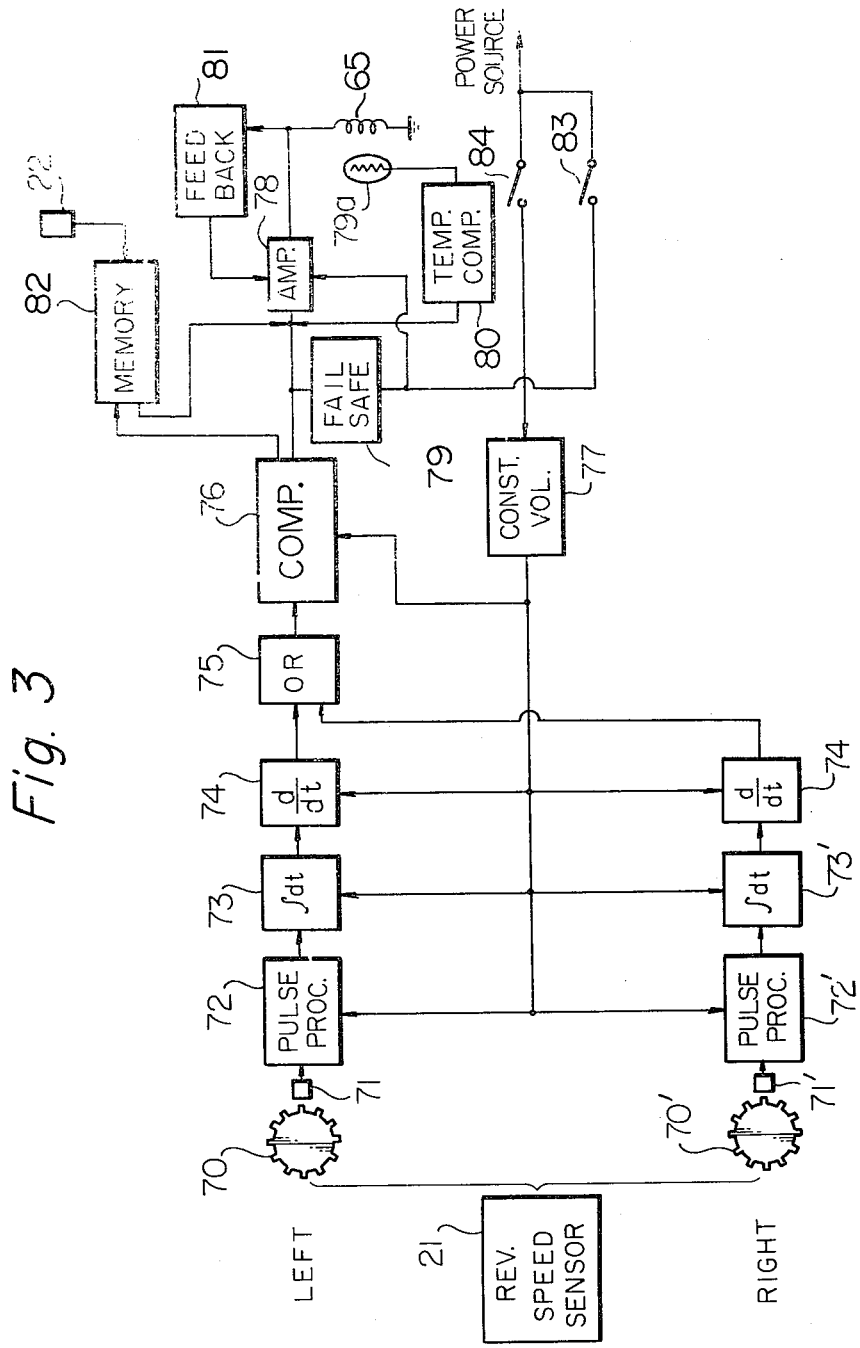
FIG. 3 is a block diagram showing a preferred example of an electric control means for controlling the fluid pressure control means shown in FIG. 2.
Figure 4:
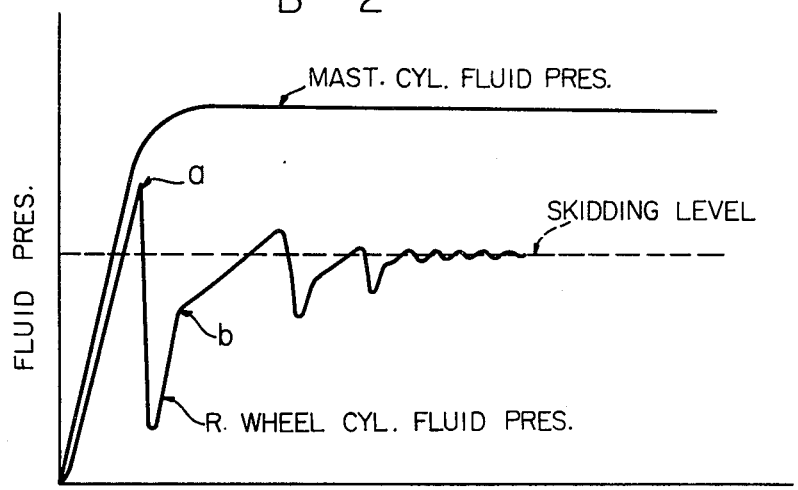
Figure 5:
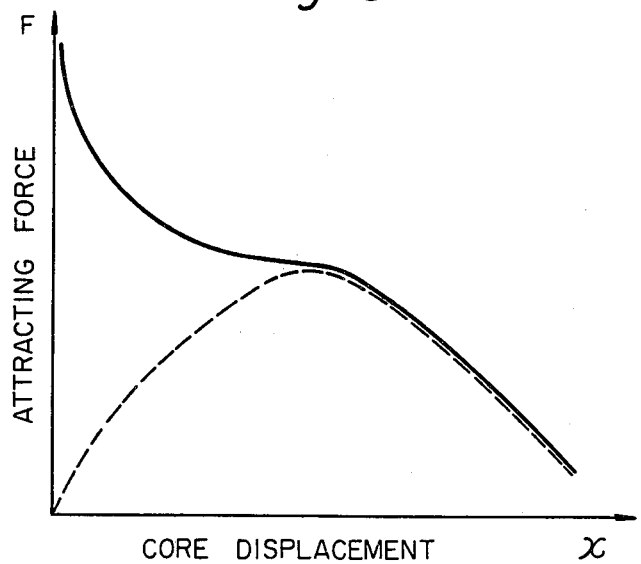
Figure 6:
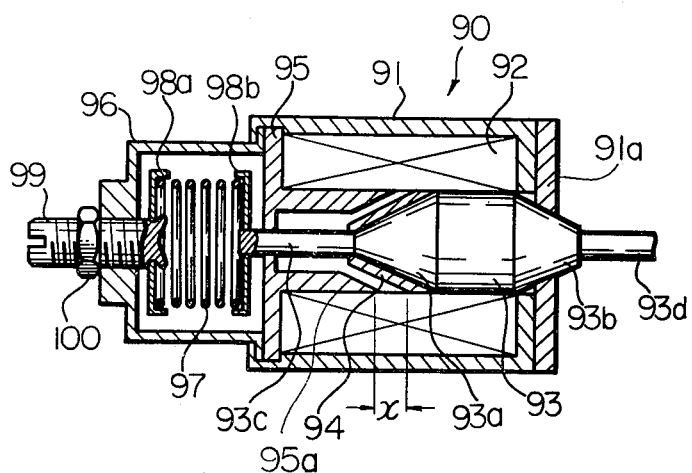
Figure 7:
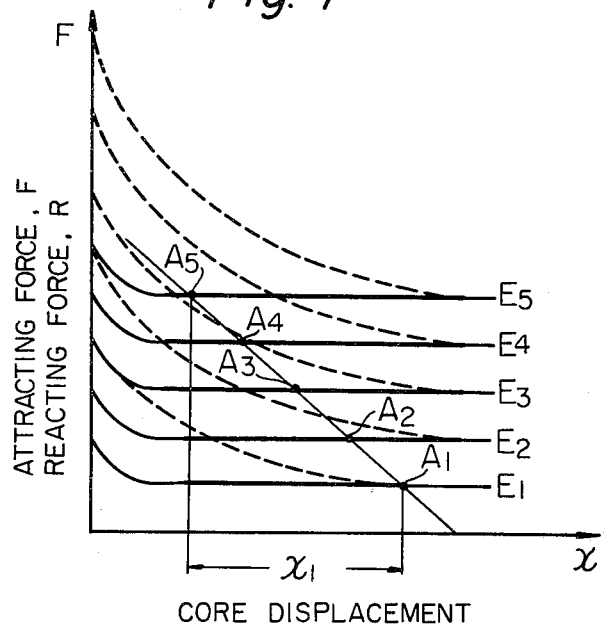
Figure 8:
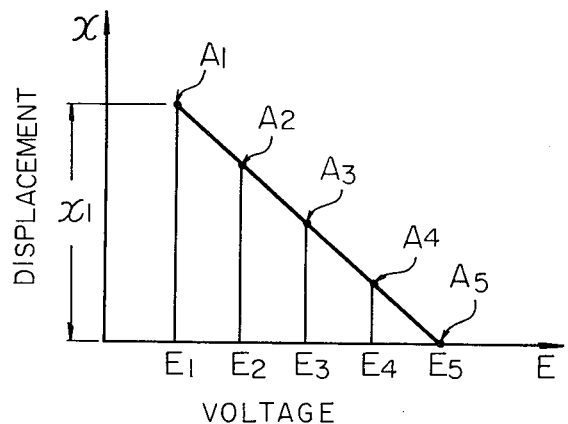
Figure 9:
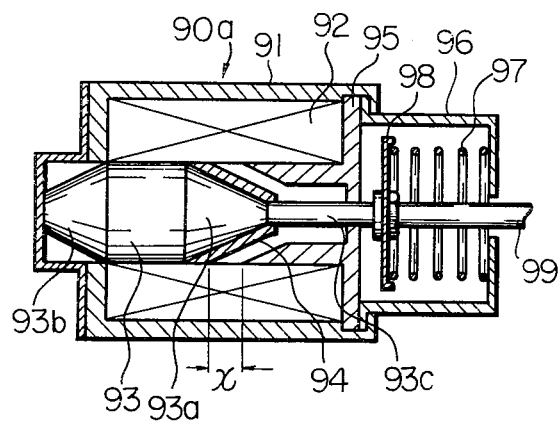

FIG. 4 contains plots illustrating different characteristics of the fluid pressure which is regulated by the control means shown in FIGS. 2 and 3;

FIG. 5 is a graphic representation of operation characteristics of usual solenoids using and not using a heel piece;

FIG. 6 is a longitudinal sectional view showing a preferred example of the solenoid device to be used in the fluid pressure control means shown in FIG. 2;

FIGS. 7 and 8 are graphic representations of operation characteristics of the solenoid device shown in FIG. 6; and FIG. 9 is similar to FIG. 6 but shows another preferred example of the solenoid device.

Figure 1:
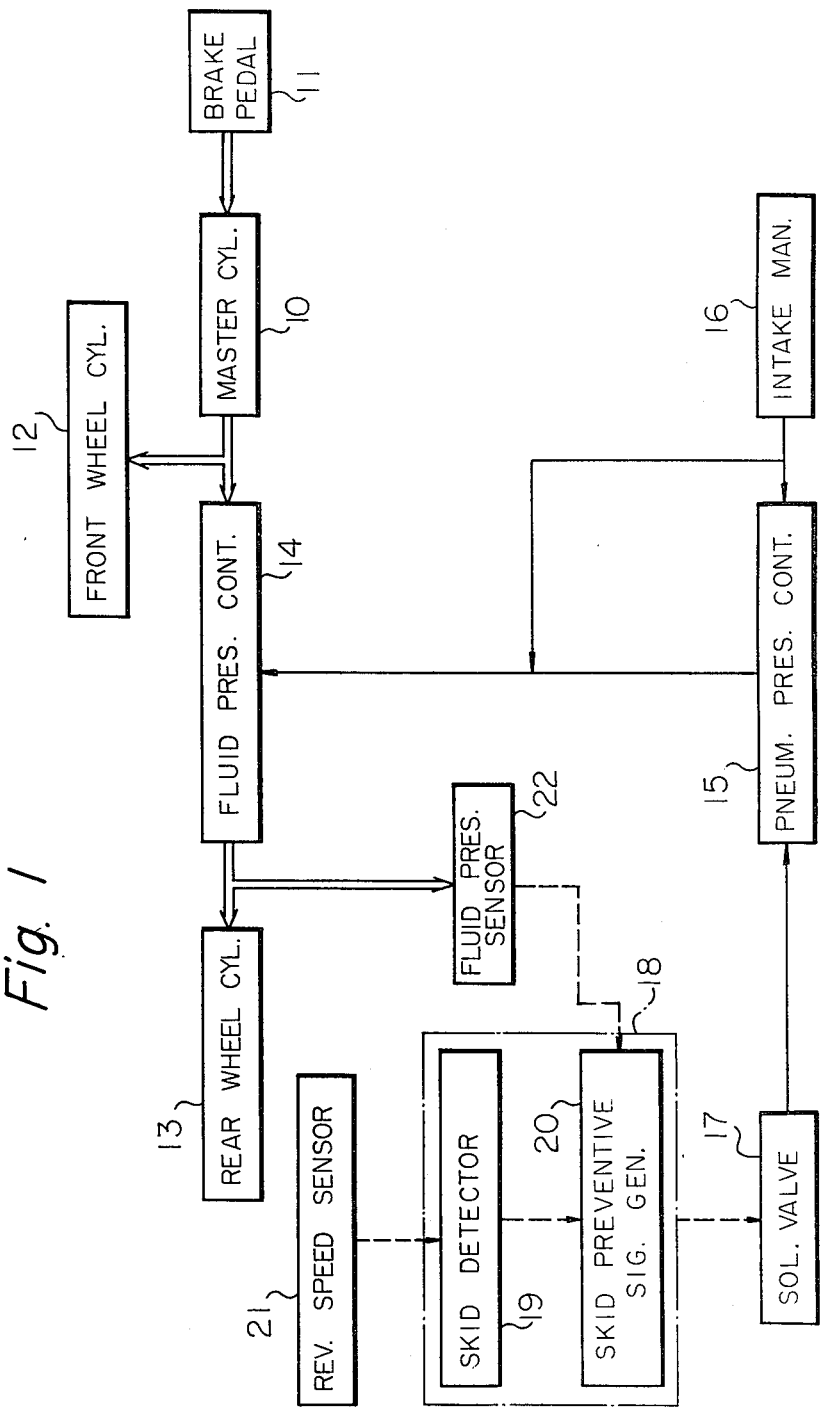
FIG. 1 is a block diagram showing a general construction of the brake control system according to this invention.

Reference is first had to FIG. 1, wherein the brake control system is shown to comprise, as customary a master cylinder 10 with brake pedal 11, a wheel brake mechanism including a front wheel cylinder 12 and a rear brake cylinder 13 which are connected to the master cylinder 10, and a connecting tubing or brake lines (not numbered). Between the master cylinder 10 and the rear wheel cylinder 13 is connected a vacuum operated fluid pressure control unit 14 whereby the fluid pressure to be supplied to the rear wheel cylinder 13 is controlled. The fluid pressure control unit 14 is connected to and operated by a pneumatic control unit 15. The pneumatic control unit 15 in turn is connected on one hand to an intake manifold 16 of an engine (not shown) and on the other hand to a solenoid valve 17 which is responsive to the revolution speed of a driving wheel (not shown) of the vehicle.

The solenoid valve 17 is connected to and operated by an electric control means 18 comprising a skid detector 19 and a skid preventive signal generator 20 connected to the skid detector 19. The skid detector 19 is connected to means 21 for sensing the revolution speeds of the rear driving wheels (not shown). The skid preventive signal generator 20 is connected not only with the skid detector 19 but to means 22 for sensing the fluid pressure supplied to the rear wheel cylinder 22. In FIG. 1, the connections indicated by dual thick lines, single thick lines and single broken lines show hydraulic, pneumatic and electrical connections, respectively.

When, now, the brake pedal 11 is depressed during cruising of the motor vehicle, a pressurized brake operating fluid is supplied to the front wheel cylinder 12 and to the rear wheel cylinder 13. The fluid pressure control means 14 is, at this moment, held in a condition to permit the pressurized fluid to pass therethrough. The brake is applied on the driving wheels in this manner. If, in this instance, the brake pedal 11 is depressed too violently, the driving wheel or wheels lock instantaneously and thus skidding of the driving wheel or wheels is encountered. The sensing means 21 constantly detects the revolutions speeds of the rear wheels and, when an angular wheel deceleration exceeding a predetermined level is detected by the skid detector 19, a skid preventive signal is supplied from the signal generator 20 to the solenoid valve means 17. The pneumatic control unit 15 is consequently actuated to shift the fluid pressure control unit 14 to a condition in which the fluid communication between the master cylinder 10 and the rear wheel cylinder 13 is blocked, whereby the supply of the fluid pressure to the rear wheel cylinder 13 is reduced to remove the cause of the skidding of the driving wheel or wheels. If the fluid pressure supplied to the rear wheel cylinder 13 is kept reduced for an extended period of time, then the stopping distance of the vehicle will be increased endangering the vehicle occupants. To avoid this, means is provided which operates the fluid pressure control unit 14 so as to re-open the fluid communication between the master cylinder 10 and the rear wheel cylinder 13 when the fluid pressure in the rear wheel cylinder 13 is lowered to a predetermined level.

Systems have heretofore been proposed which operate largely on the above discussed principles and a problem encountered in such prior art systems is that the angular wheel deceleration is detected in a stepwise fashion. Such stepwise detection of the angular wheel decceleration results occasionally in an excessive reduction in the brake operating fluid pressure so that the stopping distance of the vehicle is sometimes increased. Improvements are therefore made according to this invention with a view to overcoming this difficulty, which improvements will be clarified as the description proceeds.

FIG. 2 illustrates a mechanical construction arrangement of the fluid pressure control means incorporated in the system according to this invention.

As illustrated, the fluid pressure control means includes the fluid pressure control unit 14, pneumatic control unit 15 and solenoid valve 17 which are all schematically shown in FIG. 1.

The fluid pressure control unit 14 comprises a valve section 23 and a valve operating section 24. The valve section 23 includes a housing 25 having formed therein a cavity 26. An inlet port 27 and an outlet port 28 lead from the cavity 26, communicating with the master cylinder 10 and the rear wheel cylinder 13, respectively. A ball check valve 29 and a compression spring 30 are accommodated in the cavity 26, the valve being biased by the compression spring to be seated on a constriction or valve seat 31 formed between the inlet and outlet ports 26 and 27, respectively.

The valve operating section 24 includes a housing 32 which is divided into two separate chambers, i.e., an atmospheric chamber 33 and a suction chamber 34 by a unitary diaphragm member 35. A plunger 36 is mounted on the diaphragm member 35, extending through the atmospheric chamber 33 and a passage 37 formed in the housing 25. The plunger 36 is tapered at its leading end 36a and is connected thereat to the ball check valve 29 of the fluid pressure control unit 23, as illustrated. A compression spring 37 is mounted in the suction chamber 34 whereby the diaphragm member 35 is biased to a position in which the suction chamber 34 is enlarged. The suction chamber 34 communicates through a passage 38 with the intake manifold 16 of the engine (not shown) downstream of a carburettor throttle valve 39. A one-way check valve 38a may be mounted in the passage 38, if preferred. The vacuum in the intake manifold 16 is thus drawn into the suction chamber 34.

The pneumatic control unit 15, on the other hand, comprises an air chamber section 40, a pressure regulating section 41 and a diaphragm operating section 42. The air chamber section 40 includes an air filter 43 and an air chamber 44 vented from the atmosphere through the air filter 43. The air chamber 44 has an opening 45 which is defined by an annular valve seat 46. The air chamber 44 has mounted therein a compression spring 47 and an air valve 48 which is positioned relative to the valve seat 46. The air valve 48 is biased against the valve seat 46 by the compression spring 47 whereby the opening 45 is closed. The pressure regulating section 41 includes a pressure regulating chamber 49 which communicates with the air chamber 44 when the air valve 48 is unseated from the valve seat 46. The pressure regulating chamber 49 is defined by a diaphragm member 50 which has an opening 51 and which as an annular valve seat mounted thereon. The pressure regulating chamber 49 has mounted therein a compression spring 52 and a suction valve 53. The compression spring 52 is seated on the inside wall surface of the diaphragm member 50 which consequently is biased away from the opening 45 at which the pressure regulating section 41 merges with the air chamber section 40. The suction valve 53 is rigidly connected to the air valve 47 of the air chamber section 40 by a connecting rod 54. The diaphragm operating section 42 includes a vacuum chamber 55 and a diaphragm chamber 56 which are separated by a second diaphragm member 57. The diaphragm chamber 56 is defined one side by this diaphragm member 57 and on the other by a third diaphragm member 58 which is exposed to the atmosphere. The diaphragm members 50, 57 and 58 are connected rigidly to each other by a connecting member 59. The diaphragm chamber 56 communicates with the air chamber 44 of the air chamber section 40 through a conduit 60 which is constricted to form an orifice 60a where it is opened into the diaphragm chamber.

The pressure regulating chamber 49 communicates with the atmospheric chamber 33 through a passage 61. A communication is also provided between the vacuum chamber 55 and the diaphragm chamber 56 through passage 61 and 62 leading respectively therefrom. The passages 61 and 62 meet each other at a valve operating chamber to be later discussed.

The solenoid valve 17 is positioned adjacent the pressure regulating section 41 and the diaphragm operating section 42. The solenoid valve 17 includes a solenoid core 64 which is surrounded by a solenoid coil 65. The solenoid core 64 is integral with a needle valve 66 which extends through a valve operating chamber 67 and which is directed toward the passage 63 leading to the diaphragm chamber 56. A compression spring 68 is mounted in the valve operating chamber 67 whereby the needle valve 66 is biased to close the passage 63, i.e., in a direction in which the solenoid core 64 is protruded. The passages 62 and 63 meet each other at this valve operating chamber 67 which, in turn, communicates with the intake manifold 16 through a passage 69 whereby the vacuum in the intake manifold is carried to the vacuum chamber 55 and, if the needle valve 66 is held in its retracted position, to the diaphragm chamber 56. The solenoid coil 65 of the solenoid valve 17 is connected to the electric control means 18, as previously described.

When the pneumatic control means 15 is kept inoperative with the solenoid valve 17 kept de-energized, the needle valve 68 is forced to be seated by the action of the compression spring 67 so as to close the passage 63. The passage 63 thus being closed, the diaphragm chamber 65 is internally maintained at an atmospheric pressure with atmospheric air drawn thereinto from the air chamber 44 of the air chamber section 40 through the conduit 60. The vacuum chamber 55 is maintained at a subatmospheric pressure or a vacuum with the vacuum drawn thereinto from the intake manifold 16 through the passage 69. The vacuum drawn into the vacuum chamber 55 acts on the diaphragm member 57 so that the diaphragm member 57 is kept urged toward the suction valve 53 together with the diaphragm members 50 and 58. The diaphragm members 50, 57 and 58 are, however, precluded from actually moving toward the suction member by means of the opposing force exerted by the compression spring 52. In other words, the spring constant of the compression spring 52 is so determined that the spring is capable of overcoming the vacuum obtaining in the vacuum chamber 55 when the diaphragm chamber 56 is internally maintained at an atmospheric pressure. Thus, the diaphragm member 50 is kept in the position remotest from the suction valve 53 which consequently is kept unseated from the valve seat mounted on the diaphragm member 50, permitting the vacuum chamber 55 to communicate with the pressure regulating chamber 49 via the opening 51, as illustrated in FIG. 2. The air valve 48 of the atmospheric section 40 is in this manner subjected to a vacuum on its inner surface and to an atmospheric pressure on its outer surface and, as a result, seated on the valve seat 46 by the action of the compression spring 47. The air chamber 44 is thus isolated from the pressure regulating chamber 46 when the passage 63 leading to the diaphragm chamber 56 is closed by the needle valve 66 of the solenoid valve 17.

With the vacuum drawn into the pressure regulating chamber 49 when the diaphragm member 50 is positioned to be remotest from the suction valve 53, the atmospheric chamber 33 of the fluid pressure control unit 14 is maintained at a vacuum through the passage 61. In this instance, the diaphragm member 35 of the fluid pressure control unit 14 is subjected to combined forces of the vacuum in the suction chamber 34 and the compression spring 30 of the valve section 23 and the combined opposing forces of the vacuum in the atmospheric chamber 33 and the compression spring 37 of the valve operating section 24. The spring constant of the spring 37 of the valve operating section 24 is sufficiently greater than that of the spring 30 of the valve section 23 so that the diaphragm member 35 is held in the position rearest the valve section 23, as illustrated in FIG. 2. It therefore follows that the ball check valve 29 connected to the diaphragm member 35 through the connecting rod 36 is forced to be unseated from the valve seat 31 against the action of the compression spring 30, allowing the fluid in the inlet port 27 to flow into the outlet port 28. The pressurized fluid is in this manner passed from the master cylinder 10 to the rear wheel cylinder 13 through the cavity 26 of the valve section 23 of the fluid pressure control unit 14 when the brake pedal 11 is depressed, unless the passage 63 leading to the diaphragm chamber 56 is opened, i.e., skidding is encountered by the drving wheel or wheels.

When, now, skidding is encountered by the driving wheel or wheels with the brake pedal 11 depressed, the electric control means 18 becomes operative to excite the solenoid coil 65 of the solenoid valve 17, causing the solenoid core 54 and accordingly the needle valve 66 to retract from their initial positions which are illustrated in FIG. 2. The needle valve 66 is thus unseated so as to open the passage 63 which now communicates with the passage 62 leading to the vacuum chamber 55 and with the passage 69 communicating with the intake manifold 16. Here, it is to be noted that the open area of the inlet to the passage 63 is increased progressively because the needle valve 66 is tapered toward its leading end and because the solenoid core 64 is retracted gradually for the reason to be discussed later. The passage 63 thus being open, the pressure obtaining in the diaphragm chamber 56 decreases toward the level of the vacuum prevailing in the intake manifold 16 because the atmospheric air drawn from the air chamber 44 through the conduit 60 is pulled over to the intake manifold 16. In this instance, the pressure in the diaphragm chamber 56 decreases continuously or steplessly because the passage 63 is opened progressively and because the flow of atmospheric air from the air chamber 44 is restricted when passing through the constriction or orifice 60a. When the vacuum thus established in the diaphragm chamber 56 reaches a predetermined level, then the diaphragm members 50, 57 and 58 move toward the suction valve 53 against the action of the compression spring 52 because of the differential pressures applied to the diaphragm members 57 and 58. The valve seat (not numbered) mounted on the diaphragm member 50 is brought into contact with the suction valve 53, isolating pressure regulating chamber 49 from the vacuum chamber 55. The suction valve 53 is held stationary in contact with the valve seat on the diaphragm member 50 although the vacuum in the diaphragm chamber 56 further increases, because of the differential pressures applied to the inner and outer surfaces of the air valve 48 rigidly connected to the suction valve 53 and because of the pressure exerted on the air valve 48 by the compression spring 47 in the air chamber 44. As the angular vehicle deceleration still increases and accordingly the passage 63 becomes fully open to cause the vacuum in the diaphragm chamber 56 to reach the level of the vacuum in the intake manifold 16, the suction valve 53 is moved together with the diaphragm members 50, 57 and 58 toward the annular valve seat 46 of the atmospheric chamber section 40 with the result that the air valve 48 is accordingly moved away from the valve seat 46 against the action of the compression spring 47. To facilitate such movement of the valves 48 and 53, the outermost diaphragm member 58 may be sized to be larger working area than the remaining diaphragm members 50 and 57. In any event the working areas of the diaphragm members 50, 57 and 58 may be determined in relation to the level of the vacuums built up in the intake manifold 16 and the spring constant of the compression springs 47 and 52. The air valve 47 thus being unseated from the valve seat 46, the pressure regulating chamber 49, which is isolated from the vacuum chamber 55 by the suction valve 53, is now permitted to communicate with the air chamber 44 with the result that atmospheric air flows into the pressure regulating chamber 49. The atmospheric air introduced into the pressure regulating chamber 49 is passed over to the atmospheric chamber 33 of the valve operating section 24 of the fluid control unit 14 through the passage 61. The diaphragm member 35 of the valve control section 24 is consequently moved away from the valve section 14 against the action of the compression spring 37 whereby the ball check valve 29 connected to the diaphragm member 37 through the rod 36 is caused to seat on the valve seat 31, blocking the fluid communication between the inlet and outlet ports 27 and 28, respectively. The pressurized fluid delivered from the master cylinder 10 is in this manner prevented from being passed to the rear wheel cylinder 13 so that the skidding of the driving wheel or wheels is ceased.

A preferred example of the construction arrangement of the electric control means 18 which is shown in a block form in FIGS. 1 and 2 is illustrated in FIG. 3.

Referring to FIG. 3, the electric control means 18 comprises means 21 for sensing the revolution speeds of the right and left driving wheels (not shown). Such sensing means or sensor 13 may include right and left serrated rotors 70 and 70' and associated magnetic pick-up means 71 and 71', respectively, whereby electric pulses which corresponds in number to the revolution speeds of the right and left driving wheels are produced. The sensor 13 is connected to right and left pulse processors 72 and 72', respectively, so that the thus produced pulses are shaped properly. The pulse processors 72 and 72' are connected to right and left integrators 73 and 73', respectively, whereby voltages which are substantially proportional to the numbers of the pulses delivered from the pulse processors 72 and 72' and accordingly to the revolution speeds of the right and left driving wheels are produced. The thus produced voltages are fed to right and left differentiators 74 and 74' which are connected to the integrators 73 and 73', respectively, for producing voltages representing the angular deceleration of the respective driving wheels. The differentiators 74 and 74' are connected to an OR circuit which acts to pass therethrough a voltage when at least either of the voltages supplied from the differentiators 74 and 74' reaches a predetermined level. The output voltage of the OR circuit is thus representative of the angular deceleration of the right or left driving wheel. The OR circuit is connected to a comparator 76 which is connected with a constant voltage supply means 77 supplying to the comparator 76 a constant voltage which is indicative of a predetermined angular deceleration of the driving wheel. The output voltage delivered from the OR circuit is thus compared with the constant voltage supplied from the constant voltage supply means 77 and, when the input voltage from the OR circuit 75 is higher than the constant voltage from the means 77, then the former is passed therethrough. The comparator 76 is connected to an amplifier 78 whereby the voltage passed through the comparator 76 is amplified. The thus amplified signal voltage is supplied to the solenoid coil 65 of the solenoid valve 17 (FIG. 2), which is consequently excited to cause the solenoid core 64 to retract.

By preference, a fail safe unit 79 may be looped between the comparator 67 and the amplifier 78, acting to shut down the amplifier 78 in the event a failure is involved in the amplifier 78 and the solenoid coil 65 is kept energized so as to make the braking inoperative with the brake operating fluid pressure kept reduced.

If, furthermore, the solenoid coil 65 is kept excited for a prolonged period of time or frequently and is consequently heated to an elevated temperature, then the voltage flowing therethrough will be reduced significantly with the result that the solenoid valve 17 fails to properly respond to the revolution speed of the driving wheel. To compensate for such reduction in the voltage to be supplied to the solenoid coil 65, temperature compensating means 80 may be looped between the amplifier 78 and the solenoid coil 65 whereby the voltage delivered to the solenoid coil 65 is raised to a proper level when the solenoid coil 65 is heated.

The amplifier 78 may be provided with a feedback circuit 81 whereby the repeated restorations of the supply of the brake operating fluid to the rear wheel cylinder are effected moderately and at a reduced number of times.

The fluctuations of the fluid pressure may be suppressed to regulate the fluid pressure to an optimum level through provision of a memory circuit 82 which serves to store a voltage indicative of the maximum level of the fluid pressure as detected by the fluid pressure sensing means 22 when the supply of the brake operating fluid is restored. For this purpose, the memory circuit 82 is connected to the comparator 76 so as to receive a signal voltage representative of the angular wheel deceleration. The signal voltage issuing from the memory circuit 82 is supplied to the amplifier 78 whereby the voltage to be supplied to the solenoid coil 65 is controlled in a manner to provide an optimum reduction of the fluid pressure and a moderate repetition of the restorations of the supply of the fluid pressure.

The pulse processors 72 and 72', integrators 73 and 73', differentiators 74 and 74' and OR circuit 75 constitute the skid detector 19, while the comparator 76 with the constant voltage supply means 77 and the amplifier 78 constitute the skid preventive signal generator 20.

Designated by reference numeral 83 is a switch which is connected between a power source (not shown) and the electric control means 18 and which is closed when the brake pedal is depressed. Reference numeral 84 illustrates an ignition switch which is also connected between the above said power source and the electric control means 18.

The performance characteristics of the brake control system as hereinbefore described with reference to FIGS. 1, 2 and 3 will be better understood from observation of FIG. 4. Referring first to the graph A of FIG. 5, there is illustrated a plot showing the dependency of the brake operating fluid pressure upon the effective open area of the passage 63 which is regulated by the movement of the needle valve 66 as illustrated in FIG. 2. As herein seen, the fluid pressure to be supplied to the rear wheel cylinder 13 as indicated by the curve $a$ varies substantially linearly as the open area of the passage 63 varies within a certain range of the open area as defined by the broken lines $b$ and $c$. This means that the brake operating fluid pressure varies substantially linearly as the angular wheel deceleration varies in a range corresponding to the range indicated by the broken lines $b$ and $c$. In the brake control system according to this invention, the brake operating fluid pressure is reduced substantially in proportion to the angular wheel deceleration so that the fluid pressure is controlled continuously and steplessly, different from the brake control systems of prior art constructions.

The plot B-1 of FIG. 4 illustrates the fluctuations of the fluid pressure to be supplied to the rear wheel cylinder 13 when the electric control means including the skid detector 19 and the skid preventive signal generator 20 but not including the compensator 80, feedback circuit 81 and memory circuit 82. The plot B-2 of FIG. 4 is similar to the plot B-1 but illustrates the fluid pressure variation where the compensator 80, feedback circuit 81 and memory circuit 82 are incorporated in the electric control means of FIG. 3. In B-1 and B-2 of FIG. 4, the term "skidding level" refers to a range of the brake operating fluid pressure providing a slipping rate between the driving wheel and the road surface at which the friction therebetween peaks up, such slipping rate being known to lie between 15 to 30%. The skidding level is thus actually a range with a certain width but is herein shown as a level for simplicity or illustration.

Although the brake operating fluid pressure varies substantially linearly as the open area of the passage 63 of the pneumatic control means 15 as previously discussed, the fluid pressure may fluctuate as indicated by the plot B-1, finely repeating drops and rises when the skidding is encountered by the driving wheel or wheels and failing to rapidly reach the skidding level. Such frequent fluctuations of the fluid pressure lasting for a prolonged period of time will result in the flapping of the brake control system, imparting mechanical shocks and vibrations to the vehicle occupant and increasing the stopping distance. Provision of the auxiliary control means including the compensator 80, feedback circuit 81 and memory circuit 82 elliminates such difficulties.

The maximum value $a$ of the fluid pressure exceeding the skidding level as shown in B-2 of FIG. 4 is memorized by the memory circuit 82 when the skidding is detected and the fluid pressure is reduced in proportion to the thus memorized maximum value. When the fluid pressure is increased for a second time, the rising rate of the fluid pressure is moderated as indicated by $b$ in the plot of B-2 by the action of the feedback circuit 81. Through regulation of the fluid pressure in these manners, the fluctuations of the fluid pressure can be suppressed significantly and the fluid pressure can be converged to the skidding level in a shortened period of time, providing stabilized operation of the rear brake cylinder.

It will now be appreciated from the foregoing description that the brake control system according to this invention is advantageous specifically because the brake operating fluid pressure is controlled steplessly in substantial proportion to the angular wheel deceleration. Such advantage is traced to the specific construction and arrangement of the pneumatic control means 15 and the solenoid valve 17 and to the provision of the feedback circuit 81 and the memory circuit 82. If, therefore, the solenoid valve 17 is modified in a suitable manner, the advantage attainable by this invention will be amplified significantly, an example of the modified solenoid valve usable in the control system of this invention being illustrated in FIG. 6.

In the solenoid valve having a moving plunger as constructed presently, the attracting force of the solenoid relative to the displacement of the plunger is so great that it is practically difficult to have the amount of displacement of the plunger varied by varying the voltage to be supplied to the solenoid coil. Since, furthermore, the plunger is brought into direct contact with the stop member, the attracting characteristics vary depending upon the direction in which the plunger is moved with the result that the amount of displacement of the plunger can not be controlled precisely. The modified solenoid valve shown in FIG. 6 is intended to solve these problems.

Referring to FIG. 5, there are shown variations of the attracting forces of different types of solenoid valve depending upon the plunger displacement, wherein the curve indicated by thick line shows the variation where the solenoid core having a heel piece is used and the curve indicated by broken line shows the variation where the solenoid core not having a heel piece is used. As is apparent from FIG. 5, the attracting force F of the solenoid varies non-linearly as the plunger displacement $x$ varies so that the amount of the plunger displacement can not be controlled precisely merely by varying the voltage supplied to the solenoid. Since, furthermore, the attracting force varies steply when the amount of displacement of the plunger is relatively small, it is practically difficult to finely control the plunger displacement in this condition even though a suitable cushioning means is used. It is true that the attracting force is approximately proportional to the plunger displacement when the plunger displacement is in a limited small range but, as seen in FIG. 4, such limited range is so small as to be significant to provide a practical importance.

An example of the solenoid which is free from these drawbacks is illustrated in FIG. 6.

As illustrated in FIG. 6, the solenoid proposed by this invention for particular use in the control system shown in FIGS. 1 to 3, which solenoid valve is generally denoted by reference numeral 90, includes an open ended cylindrical housing 91 which serves as a heel piece. A solenoid coil 92 is mounted concentrically in the housing 91, which solenoid coil is connected to a suitable electric power source (not shown) through the electric control means 18 (FIGS. 1 or 2). A solenoid core or plunger 93 is mounted axially in the housing 91, surrounded by the solenoid coil 92. The plunger 93 has conical sections 93a and 93b which are tapered or coned toward the ends of the plunger, as shown. The plunger 93 also has shafts 93c and 93d extending from the conical sections 93a and 93b in the opposite directions. A frusto-conical spacer 94 is mounted on the conical section 93a of the plunger 93, which spacer is made of a non-magnetic material.

The housing 91 is closed at one end by an outer stop member 91a which may be integral with the housing 91 and which is centrally apertured to snugly receive the conical section 93b of the plunger 93 when the plunger is in its protruded position as illustrated. The housing 91 is closed at the other end by an inner stop member 95 which is centrally apertured to pass therethrough the shaft 93c and which has an inward extension 95a. The inward extension 95a of the stop member 95 has formed at its leading end a counter-conical section which is configured to receive the spacer 94 mounted on the conical section 93a when the plunger 93 is in its retracted position. The plunger 93 is thus axially movable in the housing 91 through a distance limited by the outer stop member 91a and the counter-conical section 95a of the inner stop member 95.

The spacer 94 has a thickness which is adapted to avoid the steep variation of the attracting force of the solenoid when the displacement of the plunger 93 is small as previously discussed with reference to FIG. 5.

Since, moreover, the plunger 93 has conical sections 93a and 93b, the amount of the space leakage flux escaping from around the conical section 93b when the plunger approaches the stop member 95 increases even though the displacement of the plunger 93 is made smaller, whereby the steep increase of the attracting force can be prevented.

An auxiliary housing 96 is mounted on the housing 91, extending from the inner stop member 95 outwardly. The auxiliary housing 96 has accommodated therein a compression spring 97 which is seated on and between outer and inner spring seats 98a and 98b, respectively. The inner seat 98b is rigidly connected to the shaft 93c of the plunger 93 while the outer seat 98a is secured to the auxiliary housing 96 through a suitable fastening means which may include an adjustment screw 99 and a locking nut 100, as illustrated. The adjustment screw 99 may be used to adjust the spring constant of the compression spring 97.

The shaft 93d is connected to the needle valve 66 shown in FIG. 2.

When, now, the solenoid coil 92 is excited, then the plunger is moved from the illustrated inoperative position toward the counter-conical section 95a of the inner stop member 95 against the action of the compression spring 97 and abuts against the inner stop member 95 through the spacer 94. The attraction characteristics of the solenoid valve thus operating are shown in FIG. 7, wherein the variations of the attracting force F and the reacting force R exerted by the compression spring 97 are illustrated in terms of the plunger displacement $x$. The curves $E_1$ to $E_5$ of thick line are voltages applied to the solenoid coil 92, the curve $E_1$ in particular being a voltage which is consumed for overcoming the action of the compression spring 97. The curves of broken line indicate attraction characteristics of a usual plungered solenoid. The line $A_1$ to $A_5$ indicates the reaction characteristics of the compression spring 97 of the solenoid shown in FIG. 6. The points $A_1$ to $A_5$ thus indicate those points at which the attracting force F of the solenoid as built up when the solenoid coil 92 is excited coincides with the reacting force R of the compression spring 97. The range $x_1$ is the effective displacement which is preferred to utilize the effects of the solenoid herein proposed. The attracting force F is substantially constant within this range $x_1$ because, as previously discussed, the plunger 93 is coned at both ends so that the flux built up by the solenoid coil 92 can be controlled as desired.

The variation in the amount of displacement of the plunger 93 in terms of the voltage applied to the solenoid coil 92 is illustrated in FIG. 8 from which it will be appreciated that the displacement of the plunger 93 can be controlled substantially in proportion to the voltage applied to the solenoid coil 92 and that the value $x_1$ is acceptable for practical purposes.

FIG. 9 shows a modification of the solenoid 90 of FIG. 6. The modified solenoid which is now generally designated by reference numeral 90a is essentially similar to the solenoid of FIG. 6 and differs therefrom in that the plunger 93 is moved in the opposite direction. Like reference numerals are allocated to corresponding parts in FIGS. 6 and 9.

In the solenoids illustrated in FIGS. 6 and 9, the plunger 93 has conical sections 93a and 93b so that, when the plunger is caused to approach the counter-conical section 95a with the solenoid coil 92 excited, the space leakage flux around the plunger is increased to moderate the attracting force. Since, furthermore, the plunger 93 is subjected to an opposing force exerted by the compression spring 97, the attracting force is further moderated. Through provision of the non-magnetic spacer 94, the displacement of the plunger 93 can be accurately controlled even though the plunger approaches closely the inner stop member 95.

What is claimed is:

1. A brake control system for a motor vehicle, comprising a master cylinder with a brake pedal, wheel cylinders, a fluid pressure network interconnecting said master cylinder and said wheel cylinders, a fluid pressure control unit for controlling fluid pressure leading to at least one of said wheel cylinders, said fluid pressure control unit including a housing having formed therein a cavity which forms a part of said fluid pressure network associated with said at least one wheel cylinder and accommodate therein a valve for controlling said fluid pressure leading to said at least one wheel cylinder, a diaphragm assembly having a chamber and a diaphragm dividing said chamber into first and second subchambers, said second subchamber being communicating with the intake manifold of the engine, a plunger extending from said diaphragm through said first subchamber and connected to said valve and a compression spring mounted in said second subchamber for biasing said diaphragm member toward a position in which said valve assumes its open position; a pneumatic control unit including an air chamber section, a pressure regulating section and a diaphragm operating section, said air chamber section including an air chamber vented from the atmosphere, an air valve mounted in said air chamber, said air chamber section having an opening which is defined by an annular valve seat on which said air valve is selectively seated, and a compression spring biasing said air valve to said annular valve seat for normally keeping said opening closed by said air valve, said pressure regulating section including a pressure regulating chamber communicating with said opening and with said first subchamber, a diaphragm member which defines said pressure regulating chamber and which has an opening, an annular valve seat mounted on the inner surface of said second diaphragm member, a compression spring mounted in said pressure regulating chamber and biasing said diaphragm member away from said opening, and a suction valve mounted in said pressure regulating chamber and connected rigidly to said air valve through a connecting rod, said suction valve being selectively seated on said annular valve seat against the action of the compression spring in said pressure regulating chamber, said diaphragm operating section including a vacuum chamber separated from said pressure regulating chamber by said diaphragm member of the pressure regulating section, a diaphragm chamber defined by an inner and outer diaphragm members, said outer diaphragm member being larger in working area than said inner diaphragm member, said inner diaphragm member separating said diaphragm chamber and said outer diaphragm member being exposed to the atmosphere, a connecting member rigidly connecting said inner and outer diaphragm members to said diaphragm member of said pressure regulating section, a conduit communicating with said air chamber and said diaphragm chamber, a first passage communicating with said diaphragm chamber and said intake manifold, a second passage communicating with said vacuum chamber and selectively with said first passage; a solenoid valve for controlling the communication between said first and second passages, said second passage being isolated from said first passage when said solenoid valve is deenergized whereby said inner and outer diaphragms and said diaphragm of said pressure regulating section are normally biased toward said suction valve, said suction valve being pressed upon said air valve when said second passage is permitted to communicate with said first passage with said solenoid valve energized whereby said pressure regulating chamber is caused to communicate with said intake manifold and the vacuum in said intake manifold is drawn into said first subchamber for moving said diaphragm member to a position in which said valve in said housing is urged to permit fluid communication in said housing; an electric control means electrically connected to said solenoid valve for energizing the same when actuated; and sensing means for sensing the revolution speeds of said at least one driving wheel and generating pulses the repetition rate of which is corresponding to the revolution speed of said at least one wheel, said electric control means being actuated when the angular wheel deceleration as detected from said revolution speed exceeds a predetermined level.

2. A system according to claim 1, wherein said solenoid valve comprises a solenoid coil connected to said electric control means and a solenoid core integral with a needle valve, said needle valve being positioned relative to said pneumatic control unit for actuating the same when said solenoid valve is energized.

3. A system according to claim 2, wherein said solenoid core has conical sections which are coned toward both ends.

4. A system according to claim 2, wherein said solenoid core further has a frusto-conical spacer which is mounted on one of said conical sections which is positioned relative to a stop member.

5. A system according to claim 2, wherein said solenoid valve has a compression spring biasing said solenoid core in a direction opposite to the direction in which said core is caused to retract when said solenoid valve is energized.

6. A system according to claim 1, wherein said electric control means includes right and left pulse processors connected to said sensing means for shaping said pulses generated by said sensing means, right and left integrators connected to said right and left pulse processors, respectively, for producing voltages substantially proportional to said revolution speeds, right and left differentiators connected to said right and left integrators, respectively, for producing voltages representing angular wheel decelerations corresponding to said revolution speeds, an OR circuit connected to said right and left differentiators for passing therethrough a voltage when at least either of the voltages supplied from said differentiators reaches a predetermined level, a comparator connected to a constant voltage supply means supplying to said comparator a constant voltage which is indicative of a predetermined angular wheel deceleration, said comparator passing therethrough the voltage from said OR circuit when the voltage exceeds said constant voltage and an amplifier connected to said comparator for amplifying the output voltage of said comparator, said amplifier being connected to said solenoid valve for energizing same.

7. A system according to claim 6, wherein said electric control means further includes a fail safe unit acting to shut down said amplifier when the amplifier fails.

8. A system according to claim 6, wherein said electric control means further includes a temperature compensating means looped between said amplifier and said solenoid valve for increasing the output voltage of said amplifier when said solenoid coil is heated by a predetermined temperature.

9. A system according to claim 6, wherein said electric control means further includes a feedback circuit whereby the repeated restorations of the supply of said brake operating fluid to said rear wheel cylinder are effected moderately and at a reduced number of times.

10. A system according to claim 6, wherein said electric control means further includes sensing means for sensing the fluid pressure to be delivered to said rear wheel cylinder and a memory circuit connected to said comparator and memorizing the maximum level of the fluid pressure as detected by said sensing means when said comparator is energized.

* * * * *